United States Patent [19]

Brown et al.

[11] Patent Number: 5,144,978
[45] Date of Patent: Sep. 8, 1992

[54] SELF-VENTING DRAIN VALVE

[75] Inventors: Gene W. Brown; David A. Biere, both of Kearney, Nebr.

[73] Assignee: Baldwin Filters, Inc., Kearney, Nebr.

[21] Appl. No.: 828,556

[22] Filed: Jan. 31, 1992

[51] Int. Cl.[5] .............................................. F16K 24/00
[52] U.S. Cl. .................................... 137/588; 251/144; 251/351
[58] Field of Search ................. 137/588; 251/144, 351

[56] References Cited

U.S. PATENT DOCUMENTS

| 3,322,168 | 5/1967 | Kitabayashi | 137/588 X |
| 4,314,689 | 2/1982 | Wilson | 251/144 X |
| 4,440,193 | 4/1984 | Matheson | 137/588 X |
| 4,708,171 | 11/1987 | Cudaback | 137/588 |
| 4,893,651 | 1/1990 | Herman | 137/588 |

Primary Examiner—Robert G. Nilson
Attorney, Agent, or Firm—Leydig, Voit & Mayer

[57] ABSTRACT

The valve includes a rubber gasket which is clamped and sealed to the sheet metal vessel of a fuel/water separator by a rivet nut and which serves as a seat for the valve head of a valve member that is screwed into the rivet nut. When the valve member is opened, the valve head moves upwardly away from the gasket to allow air to enter the vessel through one passage in the valve member and to enable liquid to drain from the vessel through a separate passage in the valve member. The valve member may be formed as two die cast parts which interfit with one another to define the passages and which eliminate the need of machining the passages. Alternatively, the valve member may be a single die cast part with internal passages, there being a die cast operating knob attached to the valve member.

13 Claims, 2 Drawing Sheets

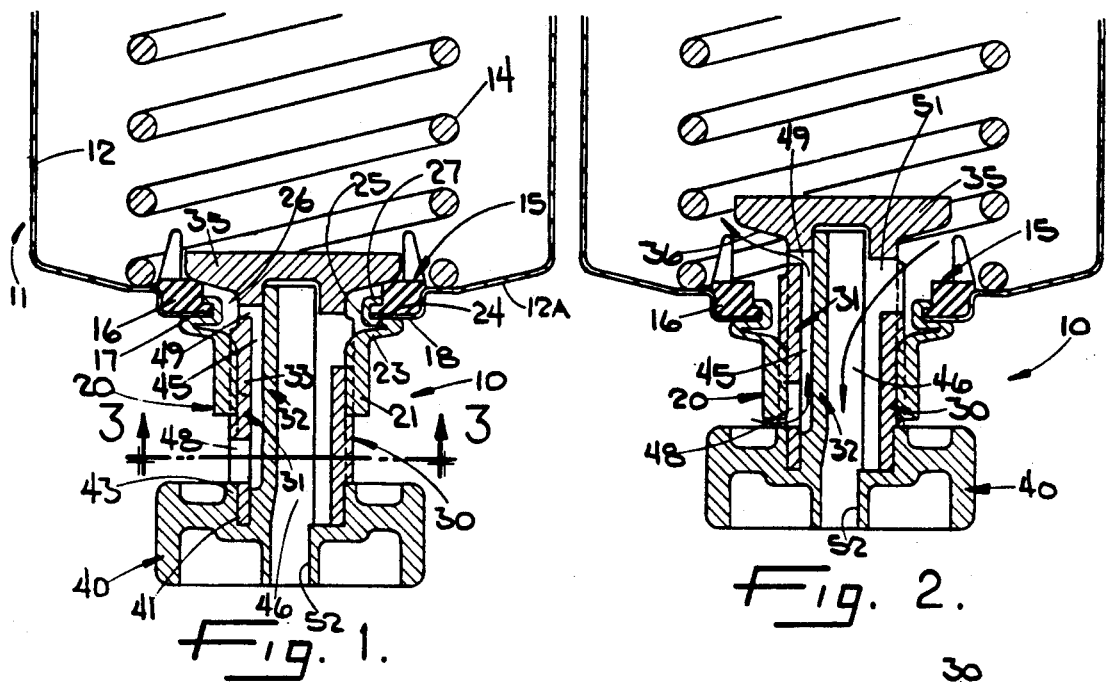
Fig. 1.
Fig. 2.
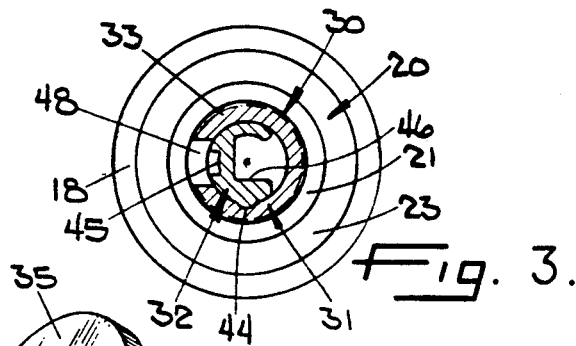
Fig. 3.
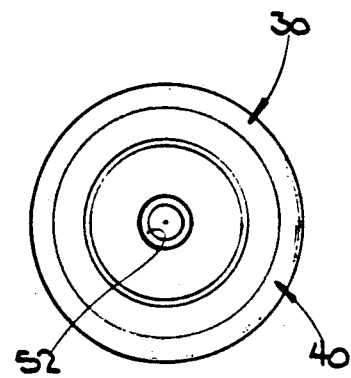
Fig. 4.
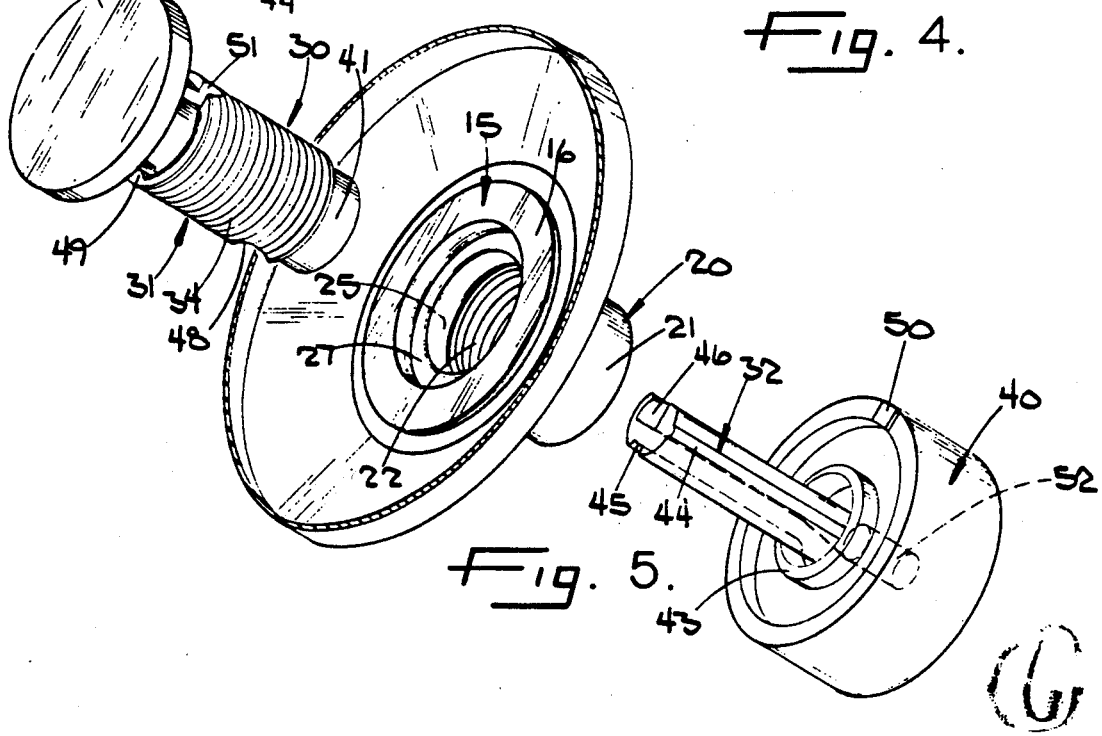
Fig. 5.

SELF-VENTING DRAIN VALVE

BACKGROUND OF THE INVENTION

This invention relates to a drain valve and, more particularly, to a drain valve which is especially useful for draining liquid from a closed vessel whose interior is under a vacuum at the time the valve is first opened. One such vessel forms part of a fuel/water separator or filter for an internal combustion engine. As fuel flows through the filter element, water is separated therefrom and collects at the bottom of the vessel. Periodically, water and other contaminants must be drained from the vessel. Rapid and complete draining can be effected only if ambient air is admitted into the vessel to break the vacuum therein.

Drain valves which are particularly adapted for use in fuel/water separators are disclosed in Wilson U. S. Pat. No. 4,314,689; Matheson U. S. Pat. No. 4,440,193 and Cudaback U. S. Pat. No. 4,708,171.These patents and others are summarized in Herman et al U. S. Pat. No. 4,893,651.

The Herman et al patent discloses a valve in which a stem is threadably received in a nut which is welded to the lower end of the vessel, the stem being formed with air and liquid passages which are isolated from one another. When the valve is closed, a gasket on the lower end portion of the stem seats against the weld nut to seal the passages and the vessel. The valve is opened by rotating the stem to move the gasket downwardly away from the weld nut and to enable the two passages to communicate with atmosphere. Air flows into the vessel via one of the passages to break the vacuum while liquid in the vessel drains from the other passage.

While the Herman et al valve is of relatively simple construction and is described in the patent as having only one sealing gasket, the valve in fact has two potential leak paths. The first is at the gasket while the second is at the joint between the weld nut and the vessel. Since there is no gasket between the nut and the vessel, leakage will occur if an inferior weld is made or if the weld fails.

SUMMARY OF THE INVENTION

The general aim of the present invention is to provide a relatively simple and inexpensive self-venting drain valve in which a single gasket not only seals the movable valve member in its closed position but also seals the overall valve to the vessel itself.

A more detailed object of the invention is to achieve the foregoing by providing a valve having a valve member with a valve head located in the vessel and adapted to seat against the same gasket that seals the valve to the vessel.

The invention also resides in the unique die cast construction of the valve member to enable two separate passages to be formed in the valve member in a relatively inexpensive manner.

These and other objects and advantages of the invention will become more apparent from the following detailed description when taken in conjunction with the accompanying drawings.

BRIEF DESCRIPTION OF THE DRAWINGS

FIG. 1 is a fragmentary cross-sectional view taken axially through a typical fuel/water separator equipped with one embodiment of a new and improved drain valve incorporating the unique features of the present invention.

FIG. 2 is a view similar to FIG. 1 but shows the valve member of the valve in an open position.

FIG. 3 is a fragmentary cross-section taken substantially along the line 3—3 of FIG. 1.

FIG. 4 is a bottom plan view of the valve.

FIG. 5 is an enlarged exploded perspective view of the components of the valve and the bottom of the fuel/water separator.

DETAILED DESCRIPTION OF THE PREFERRED EMBODIMENTS

Figure 6:
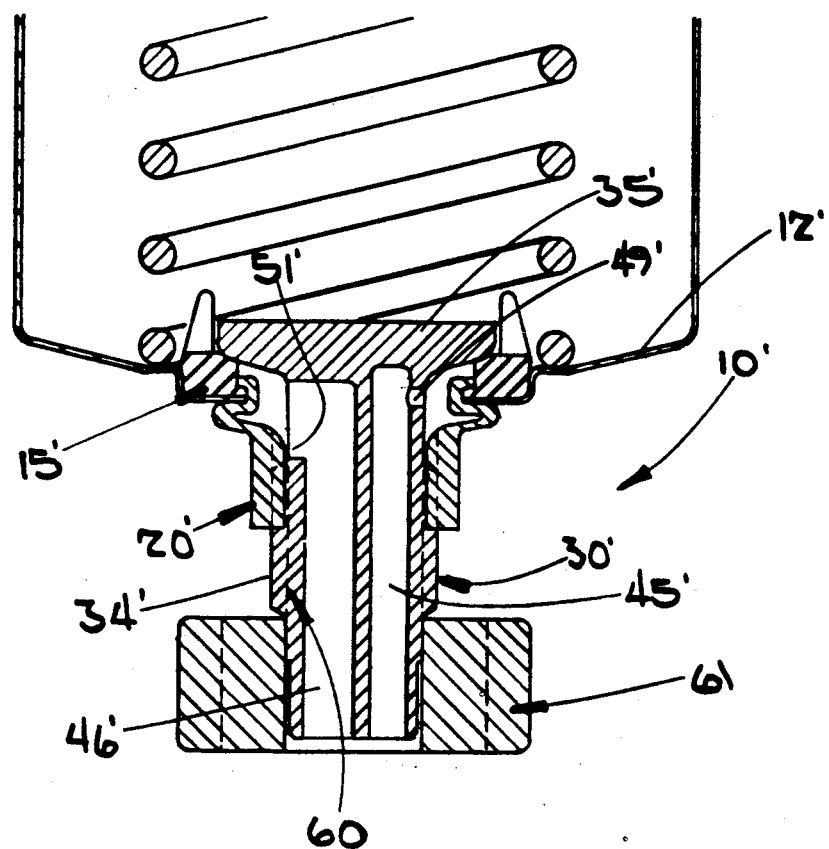
FIG. 6 is a fragmentary view generally similar to FIG. 1 but shows another embodiment of the drain valve of the invention.

For purposes of illustration, the drain valve 10 of the invention has been shown in the drawings in conjunction with a fuel/water separator 11 of the type used with an internal combustion engine such as a diesel engine. The separator includes a closed sheet metal vessel 12 which houses a filter (not shown) that is held and located in the vessel by a coil spring 14. During typical operation, fuel flows through the filter while water and heavier molecular particles are separated therefrom and accumulate in the lower portion of the vessel.

The vessel 12 must be drained periodically in order to remove the water and other contaminants. When the engine is shut down, a vacuum exists in the vessel and, in order to drain the vessel, it is necessary to break the vacuum by admitting air into the vessel.

The present invention contemplates the provision of a new and improved self-venting drain valve 10 which is of relatively simple and inexpensive construction and which is particularly characterized in that all possible leak paths through or past the valve are sealed by a single seal or gasket 15. The use of a single gasket for sealing off all of the leak paths helps assure against leakage from the separator 11 and enables the valve to be manufactured and assembled at relatively low cost.

More specifically, the sealing gasket 15 is molded from an elastomeric material such as Nitrile and is a ring which is generally L-shaped in axial cross-section. Thus, the gasket 15 includes a relatively wide and thick seat portion 16 and further includes a narrower and thinner sealing fin portion 17 spaced downwardly from and projecting radially inwardly from the seat portion. The gasket is received in and is backed by a generally L-shaped depression or well 18 formed in the bottom wall 12A of the vessel 12.

In carrying out the invention, the gasket 15 is clamped to the bottom wall 12A of the vessel 12 by a so-called rivet nut 20 which also forms a housing for the valve 10. The rivet nut is made of ductile metal and includes a lower tubular body 21 which is internally threaded as indicated at 22 in FIG. 5. The body is formed with a one-piece annular upper end portion which is defined by a lower outwardly extending flange 23 (FIG. 1), by an upper inwardly extending flange 24 which overlies the flange 23 and which engages the lower side of the well 18, by a cylindrical sleeve 25 projecting upwardly from the inner margin of the flange 24 and through a vertically extending circular opening 26 formed through the well 18, and by a lip 27 extending outwardly from the upper end of the sleeve 25 in vertically spaced opposing relation with the upper side of the well 18 adjacent the opening 26. When the rivet nut 20 is initially formed, the flanges 23 and 24, the sleeve 25 and the lip 27 form a tubular cylindrical extension projecting axially from the internally threaded body 21. The gasket 15 and the rivet nut 20 are installed by placing the gasket in the well 18 and by inserting the aforementioned extension upwardly through the opening 26. Upper and lower tools (not shown) then are used to deflect and crimp the extension and thereby convert the extension to the flanges 23 and 24, the sleeve 25 and the lip 27. As an incident to the crimping, the sealing fin 17 of the gasket and the well 18 of the vessel 12 are clamped between the lower side of the lip 27 and the upper side of the flange 24. Thus, the gasket 15 and the rivet nut 20 are attached to the vessel 12 by a single operation.

The valve 10 includes a valve member 30 which is adapted to move upwardly and downwardly within the body 21 of the rivet nut 20 between open and closed positions with respect to the seat portion 16 of the gasket 15. In the embodiment shown in FIGS. 1 to 5, the valve member is formed by two separate outer and inner parts 31 and 32 which preferably are die cast from metal. The outer part 31 includes a cylindrical sleeve 33 which is externally threaded as indicated at 34 in FIG. 5 and is screwed into the body 21 of the rivet nut 20. Formed integrally with the upper end of the sleeve 33 is a valve head 35 whose lower surface 36 (FIG. 2) is formed with a convex spherical contour. When the valve member 30 is in its closed position shown in FIG. 1, the lower surface 36 of the valve head 35 seals against the seat portion 16 of the gasket 15 to close off the opening 26 through the vessel 12. By rotating the sleeve 33 in one direction, the threads 22 and 34 coact to advance the sleeve upwardly within the rivet nut body 21 and raise the valve head 35 off of the seat portion 16 so as to allow fluid to flow past the seat portion and through the opening 26. Rotation of the sleeve in the opposite direction returns the valve head into engagement with the seat 16, the spherical surface 36 of the head accommodating any minor misalignment between the axes of the seat and the sleeve and enabling the head to seal around its entire circumference in spite of such misalignment.

The second part 32 of the valve member 30 is an inner part in the form of an elongated stem which is received inside of the sleeve 31 and which coacts with the latter to define flow paths for liquid and air. Formed integrally with the lower end portion of the stem 32 is an enlarged operating knob 40 for rotating the stem and the sleeve 31 as a unit. The sleeve 31 is formed with an unthreaded and reduced diameter lower end portion 40 (FIG. 5) which is received with a press fit in a tubular boss 43 on the upper end of the knob 40 so as to couple the sleeve rigidly with the knob and the stem 32. An axially extending rib 44 (FIGS. 3 and 5) formed along one side of the stem 32 fits into a complementary groove in the inside of the sleeve 31 to key the stem against rotation relative to the sleeve.

The sleeve 31 and the stem 32 coact to define passages 45 and 46 which respectively admit air into the vessel 12 and allow liquid to drain from the vessel. Herein, the air passage 45 is defined by an axially extending groove formed along one side of the stem 32 and opposing the inner wall of the sleeve (see FIGS. 3 and 5). A radially extending inlet port 48 is formed through the lower end portion of the sleeve and communicates with ambient atmosphere to admit air into the groove 45. When the valve head 35 is in its open position shown in FIG. 2, air in the groove 45 may flow into the vessel 12 via a radially extending outlet port 49 formed in the upper end portion of the sleeve 31 and communicating with the groove. A small protuberance 50 (FIG. 5) is cast on the upper end of the knob 40 and engages the lower end of the body 21 of the rivet nut 20 to limit movement of the valve head 35 in the opening direction and to prevent the inlet port 48 from being closed completely off by the body when the valve head is fully open. When the valve head 35 is fully closed as shown in FIG. 1, air is, of course, prevented from entering the vessel by virtue of the valve head sealing against the gasket 15.

As shown in FIGS. 3 and 5, the liquid passage 46 is spaced diametrically from the groove 45 and is defined in part by a somewhat wider and deeper groove formed in and extending axially along the stem 32 in opposing relation with the inner wall of the sleeve 31. In the area of the groove 46, the stem is not fully circular but instead is formed with a flat side, which leaves considerable space between the stem and the sleeve. When the valve head 35 is open, liquid from the vessel 12 flows into that space and the groove 46 by way of a radially extending inlet port 51 (FIGS. 2 and 5) formed in the upper end portion of the sleeve 31 and spaced angularly from the outlet port 49. Liquid in the groove 46 is drained from the valve 10 via a vertically extending cylindrical passage 52 formed through the center of the knob 40 and having an upper end located adjacent the lower end of the groove.

As shown most clearly in FIG. 3, the stem 32 fits closely within the sleeve 31 and thus isolates the air passage 45 from the liquid passage 46. Accordingly, each fluid is constrained to flow along a separate path.

To summarize, the valve 10 is closed when the valve head 35 is positioned as shown in FIG. 1 in sealing engagement with the seat 16 of the gasket 15. The only possible leak paths are at the area of engagement of the valve head with the seat and in the area of the outer side of the sleeve 25 of the rivet nut 20. Both of these leak paths, however, are sealed by the single gasket 15.

When the valve head 35 is moved to the open position shown in FIG. 2 by rotating the knob 40, air flows through the inlet port 48 to the groove 45 and from the groove into the vessel 12 via the outlet port 49. When the vacuum is broken, liquid drains through the inlet port 51 and is discharged via the groove 46 and the passage 52.

Except for the gasket 15, all of the components of the valve 10 are made of metal and thus are not likely to change dimensions when subjected to load and temperature variations. The valve thus lends itself to heavy duty applications. Because the valve is free of radial seals which create friction, the valve member 30 may be turned with relatively low torque.

Another embodiment of a drain valve 10' incorporating the features of the invention is shown in FIG. 6 in which parts corresponding to those of the first embodiment are indicated by the same but primed reference numerals. The valve 10' differs from the valve 10 primarily in that the valve member 30' of the valve 10' is formed as a single die cast part 60 and includes a separately formed die cast part 61 which serves solely as an operating knob.

More specifically, the part 60 is a single-piece die cast body which is formed with a valve head 35'. The body 60 is externally threaded at 34' and is screwed into the rivet nut 20'. Axially extending air and liquid passages 45' and 46' are formed internally in the body 60 and both open axially out of the lower end thereof. Radially extending ports 49' and 51' are formed in the upper end portion of the body 60 and communicate with the passages 45' and 46', respectively.

The part 61 is simply an operating knob which is die cast separately of the body 60 and which is attached to the lower end portion of the body with a press fit or by other means. When the valve head 35' is moved to the open position by rotating the knob 61, air flows axially through the passage 45' and radially through the port 49' to break the vacuum in the vessel 12'. Upon breaking of the vacuum, liquid drains radially through the port 51' and axially out of the passage 46'.

We claim:

1. A selectively operable self-venting valve for enabling liquid to be drained from the bottom of a vessel having an opening extending vertically therethrough, said valve comprising an internally threaded tubular body having an upper end portion adapted to be secured to said vessel in coaxial relation with said opening, an annular seal of elastomeric material at the upper end portion of said body, an externally threaded valve member having upper and lower end portions, said valve member being screwed into said body and being movable upwardly and downwardly in said body in response to being rotated in first and second directions, a valve head on the upper end portion of said valve member and normally disposed in a closed position in engagement with said seal to prevent liquid from draining from said vessel and to prevent air from entering said vessel, said valve head moving upwardly away from said seal to an open position when said valve member is moved upwardly in said body, first and second angularly spaced and generally radially extending ports formed in the upper end portion of said valve member below said head, first and second generally axially extending passages in said valve member and having upper ends communicating with said first and second ports, respectively, said passages being isolated from one another and having lower ends communicating with ambient atmosphere whereby air flows into said vessel via said first passage and said first port while liquid drains from said vessel via said second port and said second passage when said valve head is moved to said open position.

2. A valve as defined in claim 1 in which the upper end portion of said tubular body is generally C-shaped in axial cross-section, said seal having a first portion clamped within the C-shaped upper end portion of said body and having a second portion located above and radially outwardly of said first portion and engageable with said valve head.

3. A valve as defined in claim 1 in which said valve member comprises an outer tubular part and an inner part located within and fixed to said outer part, said first and second ports extending radially through said outer part, and first and second angularly spaced and axially extending grooves formed in the outer side of said inner part and coacting with the inner side of said outer part to define said first and second passages, respectively.

4. A valve as defined in claim 3 further including a radially extending inlet port formed through the lower end portion of said outer part and establishing communication between said first groove and ambient atmosphere.

5. A valve as defined in claim 4 in which said second groove opens axially out of the lower end of said inner part to allow liquid to drain therefrom.

6. A valve as defined in claim 1 in which said valve member comprises a single part, said first and second passages being formed internally of said part and opening out of the lower end portion thereof, said first and second ports being formed in said part, extending generally radially thereof and communicating with said passages.

7. A valve as defined in claim 6 further including a separately formed operating knob attached to said valve member.

8. The combination of, a vessel made of sheet material and having a bottom wall within an opening extending vertically therethrough, and a selectively operable self-venting valve for enabling liquid to be drained from the vessel, said valve comprising an internally threaded tubular body made of ductile metal, said body having a one-piece annular upper end portion defined by an outwardly extending flange, by an inwardly extending flange overlying said outwardly extending flange and engaging the lower side of the bottom wall of said vessel in proximity to said opening, by a sleeve extending upwardly from the inner margin of said inwardly extending flange and through said opening, and by a lip extending outwardly from the upper end of said sleeve in vertically spaced opposing relation with the upper side of the bottom wall of said vessel, an annular seal of elastomeric material, said seal having a fin portion located between said lip and said bottom wall and having a seat portion located outwardly of and spaced upwardly from said fin portion, said bottom wall and said fin portion of said seal being clamped between said lip and said inwardly extending flange, an externally threaded valve member having upper and lower end portions, said valve member being screwed into said body and being movable upwardly and downwardly in said body in response to being rotated in first and second directions, a valve head on the upper end portion of said valve member and normally disposed in a closed position in engagement with the seat portion of said seal to prevent liquid from draining from said vessel and to prevent air from entering said vessel, said valve head moving upwardly away from said seal to an open position when said valve member is moved upwardly in said body, first and second angularly spaced and generally radially extending ports formed in the upper end portion of said valve member below said head, first and second generally axially extending passages in said valve member and having upper ends communicating with said first and second ports, respectively, said passages being isolated from one another and having lower ends communicating with ambient atmosphere whereby air flows into said vessel via said first passage and said first port while liquid drains from said vessel via said second port and said second passage when said valve head is moved to said open position.

9. The combination defined in claim 8 in which said valve member comprises an outer tubular part and an inner part located within and fixed to said outer part, said first and second ports extending radially through said outer part, and first and second angularly spaced and axially extending grooves formed in the outer side of said inner part and coacting with the inner side of said outer part to define said first and second passages, respectively.

10. The combination defined in claim 9 further including a radially extending inlet port formed through the lower end portion of said outer part and establishing communication between said first groove and ambient atmosphere, said second groove opening axially out of the lower end of said inner part to allow liquid to drain therefrom.

11. The combination defined in claim 8 in which said valve head includes a convex lower surface corresponding in shape to the outer surface of a portion of a sphere.

12. The combination defined in claim 8 in which said valve member comprises a single part, said first and second passages being formed internally of said part and opening out of the lower end portion thereof, said first and second ports being formed in said part, extending generally radially thereof and communicating with said passages.

13. The combination defined in claim 12 further including a separately formed operating knob attached to said valve member.

* * * * *